US012545781B2

(12) United States Patent
Aotani et al.

(10) Patent No.: US 12,545,781 B2
(45) Date of Patent: Feb. 10, 2026

(54) RESIN COMPOSITION FOR MOLDING, AND MOLDED BODY

(71) Applicants: artience Co., Ltd., Tokyo (JP); TOYOCOLOR CO., LTD., Tokyo (JP)

(72) Inventors: Tomoyuki Aotani, Tokyo (JP); Kohei Takahashi, Tokyo (JP); Chihiro Murata, Tokyo (JP); Hao Hu, Tokyo (JP); Takeshi Nishinaka, Tokyo (JP)

(73) Assignees: artiece Co., Ltd., Tokyo (JP); TOYOCOLOR CO., LTD., Tokyo (JP)

( * ) Notice: Subject to any disclaimer, the term of this patent is extended or adjusted under 35 U.S.C. 154(b) by 437 days.

(21) Appl. No.: 18/089,550

(22) Filed: Dec. 27, 2022

(65) Prior Publication Data

US 2023/0139030 A1  May 4, 2023

Related U.S. Application Data

(63) Continuation of application No. PCT/JP2021/025818, filed on Jul. 8, 2021.

(30) Foreign Application Priority Data

Jul. 9, 2020  (JP) .................. 2020-118364

(51) Int. Cl.
| | | |
|---|---|---|
| C08F 212/08 | (2006.01) |
| C08F 220/14 | (2006.01) |
| C08L 23/06 | (2006.01) |
| C08L 33/08 | (2006.01) |
| C08L 33/12 | (2006.01) |
| C08L 33/14 | (2006.01) |

(52) U.S. Cl.
CPC ................... C08L 33/14 (2013.01)

(58) Field of Classification Search
CPC .............. C08F 212/08; C08F 220/14; C08F 220/1818; C08F 220/1804; C08F 220/1811; C08L 23/06; C08L 33/08; C08L 33/12; C08L 33/14
USPC ....................................... 524/302
See application file for complete search history.

(56) References Cited

FOREIGN PATENT DOCUMENTS

| CN | 104837949 | | 8/2015 |
|---|---|---|---|
| CN | 104854140 | | 8/2015 |
| CN | 111183162 | | 5/2020 |
| JP | 58185677 | * | 10/1983 |
| JP | S58185677 | | 10/1983 |
| JP | H05255447 | | 10/1993 |
| JP | 2001072722 | | 3/2001 |
| JP | 2001114842 | | 4/2001 |
| JP | 2003129033 | | 5/2003 |
| JP | 2003129033 A | * | 5/2003 |
| JP | 2003268048 | | 9/2003 |
| JP | 2003268048 A | * | 9/2003 |
| JP | 2010007027 | | 1/2010 |
| JP | 2019184687 | | 10/2019 |
| JP | 6702493 | | 6/2020 |
| JP | 2020084178 | | 6/2020 |
| WO | 2014093139 | | 6/2014 |
| WO | 2014093141 | | 6/2014 |

OTHER PUBLICATIONS

"Office Action of China Counterpart Application", issued on Apr. 2, 2024, with partial English translation thereof, p. 1- p. 7.
"International Search Report (Form PCT/ISA/210) of PCT/JP2021/025818," mailed on Aug. 31, 2021, with English translation thereof, pp. 1-4.

(Continued)

Primary Examiner — Kelechi C Egwim
(74) Attorney, Agent, or Firm — JCIPRNET

(57) ABSTRACT

The purpose of the disclosure is to provide a resin composition for molding, said resin composition exhibiting good compatibility with polyolefins and containing an ultraviolet absorbing polymer that is able to be purified at a low cost, and said resin composition being capable of forming a molded body that exhibits good transparency. A resin composition for molding containing a thermoplastic resin and an ultraviolet absorbing polymer, wherein: the ultraviolet absorbing polymer has a monomer unit represented by general formula (1), a monomer unit represented by general formula (2) and a thiol-based chain transfer agent residue; and the thiol-based chain transfer agent that forms the thiol-based chain transfer agent residue has a thiol group and one or more moieties that are selected from the group consisting of a carboxyl group, a hydroxyl group and an ester bond.

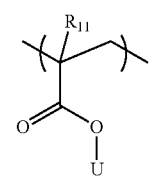

(1)

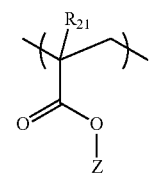

(2)

5 Claims, No Drawings

(56) References Cited

OTHER PUBLICATIONS

"International Preliminary Report On Patentability of PCT/JP2021/025818; this report contains the following items: Form PCT/IB/326, PCT/IB/338, PCT/IB/373, PCT/ISA237(cover sheet), PCT/ISA237(Box No. I), PCT/ISA237(Box No. V)", mailed on Jan. 19, 2023, which is English translation of "Written Opinion of the International Searching Authority", p. 1-p. 10.

* cited by examiner

RESIN COMPOSITION FOR MOLDING, AND MOLDED BODY

CROSS-REFERENCE TO RELATED APPLICATION

The present application is a continuation of PCT/JP2021/025818, filed on Jul. 8, 2021, and is related to and claims priority from Japanese Patent Application No. 2020-118364, filed on Jul. 9, 2020. The entire contents of the aforementioned application are hereby incorporated by reference herein.

TECHNICAL FIELD

The disclosure relates to a resin composition for molding.

RELATED ART

Conventionally, resin molded bodies (hereinafter referred to as molded bodies) have been used as the packaging materials for pharmaceutical agents, cosmetics, and the like. Contents such as pharmaceutical agents and cosmetics are easily deteriorated by ultraviolet rays, but when an ultraviolet absorber is blended, the ultraviolet absorber may migrate and contaminate the contents.

Therefore, Patent Literatures 1 and 2 disclose a resin composition for molding obtained by polymerizing polyolefin and an ultraviolet absorbing monomer in a twin-screw extruder. Patent Literature 3 discloses a resin composition for molding which contains an ultraviolet absorbing polymer polymerized using 1-dodecanethiol as a chain transfer agent.

CITATION LIST

Patent Literatures

[Patent Literature 1] Japanese Patent Laid-Open No. 2001-72722
[Patent Literature 2] Japanese Patent Laid-Open No. 2001-114842
[Patent Literature 3] Japanese Patent Laid-Open No. 5-255447

However, the resin composition for molding of Patent Literatures 1 and 2 has low compatibility between the materials contained therein and the haze of the molded body is high, and when the amount of the ultraviolet absorbing monomer is increased in order to enhance the ultraviolet absorbency, there is a problem that the transparency of the molded body is lowered. In addition, regarding the resin composition for molding of Patent Literature 3, when trying to purify using an inexpensive alcohol having a low boiling point in order to remove the low molecular weight polymer in the ultraviolet absorbing polymer in consideration of the use for pharmaceutical agents and cosmetics, since the ultraviolet absorbing polymer has a highly hydrophobic 1-dodecanethiol residue at the end of the molecule, it has low solubility to the alcohol and takes a long time to purify. On the other hand, when a non-alcoholic solvent is used, there is a problem that the remaining non-alcoholic solvent has an adverse effect on the human body, such as odor.

The disclosure provides a resin composition for molding which contains an ultraviolet absorbing polymer that can be efficiently purified at low cost, and can form a molded body that has good compatibility with polyolefin and good transparency.

SUMMARY

The resin composition for molding according to an embodiment of the disclosure is a resin composition for molding containing a thermoplastic resin and an ultraviolet absorbing polymer.

The ultraviolet absorbing polymer is a polymer having a monomer unit represented by the following general formula (1), a monomer unit represented by the following general formula (2), and a thiol-based chain transfer agent residue.

A thiol-based chain transfer agent forming the thiol-based chain transfer agent residue has a thiol group and one or more moieties selected from the group consisting of a carboxyl group, a hydroxyl group, and an ester bond.

[Chemical formula 1]

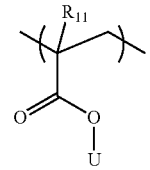

General formula (1)

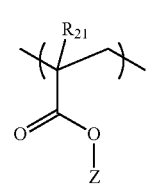

General formula (2)

In general formula (1), $R_{11}$ represents any one selected from the group consisting of a hydrogen atom and a methyl group, and U is a hydrocarbon group having a skeleton that absorbs ultraviolet rays and may contain a heteroatom.

In general formula (2), $R_{21}$ represents any one selected from the group consisting of a hydrogen atom and a methyl group, and Z represents any one selected from the group consisting of a chain hydrocarbon group having 10 or more carbon atoms and a cyclic hydrocarbon group.

According to the disclosure described above, it is possible to provide a resin composition for molding which contains an ultraviolet absorbing polymer that can be efficiently purified at low cost, and can form a molded body that has good compatibility with polyolefin and good transparency, and to provide the molded body.

DESCRIPTION OF EMBODIMENTS

Terms used in this specification, etc. are defined. In this specification, etc., "(meth)acrylic," "(meth)acrylate," "(meth)acryloyl," etc. shall mean "acrylic or methacrylic," "acrylate or methacrylate," "acryloyl or methacryloyl," etc., and for example, "(meth)acrylic acid" means "acrylic acid or methacrylic acid." In addition, a monomer means an ethylenically unsaturated group-containing compound. A monomer after polymerization is called a monomer unit, and a monomer before polymerization is called a monomer.

The resin composition for molding of the disclosure is a resin composition for molding that contains a thermoplastic resin and an ultraviolet absorbing polymer. Hereinafter, each component contained in the composition of the disclosure will be described in detail.

<Thermoplastic Resin>

The thermoplastic resin includes, for example, polyolefin such as polyethylene and polypropylene, polycarbonate, polyacrylic such as polymethyl methacrylate, polyester, cycloolefin resin, polystyrene, polyphenylene ether, acrylonitrile-butadiene-styrene copolymer (ABS resin), polyamide, polyacetal, polyvinyl chloride, polyvinylidene chloride, and polyetherimide. Among these, it is particularly preferable to select polyolefin and cycloolefin resin for good moldability and mechanical strength of the molded body can be obtained. In addition, polyester, polyacrylic, and polycarbonate are also preferable. It is preferable that the number average molecular weight of the thermoplastic resin exceeds 30,000.

<Polyolefin>

Polyolefin includes, for example, polyethylene, polypropylene polyethylene, polypropylene, polybutene-1, and poly-4-methylpentene, and copolymers thereof.

The weight average molecular weight of polyolefin is about 30,000 to 500,000, preferably 30,000 to 200,000.

Polyethylene includes, for example, low-density polyethylene and high-density polyethylene. Polypropylene includes, for example, crystalline or amorphous polypropylene.

These copolymers include, for example, ethylene-propylene random, block or graft copolymers, α-olefin and ethylene or propylene copolymers, ethylene-vinyl acetate copolymers, ethylene-methyl acrylate copolymers, ethylene-ethyl acrylate copolymers, ethylene-acrylic acid copolymers, etc.

Among these, crystalline or amorphous polypropylene, ethylene-propylene random, and block or graft copolymers are preferable, and ethylene-propylene block copolymers are more preferable. In addition, polypropylene is preferable for it is inexpensive and has a small specific gravity, so the weight of the molded body can be reduced.

The melt flow rate (MFR) of polyolefin is preferably 1 to 100 (g/10 minutes). MFR is a numerical value determined according to JIS (Japanese Industrial Standards) K-7210.

<Polycarbonate>

Polycarbonate is a compound obtained by synthesizing dihydric phenol and a carbonate precursor by a known method. Dihydric phenol includes, for example, hydroquinone, resorcinol, 2,2-bis(4-hydroxyphenyl)propane, bis(4-hydroxyphenyl)methane, 2,2-bis(4-hydroxy-3,5-dimethylphenyl)propane, 2,2-bis(4-hydroxy-3,5-dibromophenyl)propane, bis(4-hydroxyphenyl)sulfide, etc. Among these, bis(4-hydroxyphenyl)alkanes are preferable, and 2,2-bis(4-hydroxyphenyl)propane, also called bisphenol A, is more preferable. The carbonate precursor includes, for example, phosgene, diphenyl carbonate, dihaloformate of dihydric phenol, etc. Among these, diphenyl carbonate is preferable.

<Polyacrylic>

Polyacrylic is a compound obtained by polymerizing monomers such as acrylic acid and/or methyl methacrylate and/or ethyl methacrylate by a known method, which includes, for example, ethylene-methyl acrylate copolymer, ethylene-ethyl acrylate copolymer, ethylene-acrylic acid copolymer, etc. In addition to the above monomers, for example, monomers such as butadiene, α-methylstyrene, and maleic anhydride can be added for polymerization, and heat resistance, fluidity, and impact resistance can be adjusted by the amount of monomer and molecular weight.

<Polyester>

Polyester is a resin having an ester bond in the main chain of the molecule, and includes, for example, a polycondensate synthesized from dicarboxylic acid (including a derivative thereof) and diol (dihydric alcohol or dihydric phenol); a polycondensate synthesized from dicarboxylic acid (including a derivative thereof) and a cyclic ether compound; a ring-opening polymer of a cyclic ether compound, etc. Polyester includes, for example, a homopolymer of dicarboxylic acid and a diol polymer, a copolymer that use multiple raw materials, and a polymer blend that mixes these. The derivative of dicarboxylic acid is acid anhydride and an esterified product. Although there are two types of dicarboxylic acids, aliphatic and aromatic dicarboxylic acids, aromatic dicarboxylic acid that improves heat resistance is more preferable.

<Cycloolefin Resin>

The cycloolefin resin is a polymer of ethylene or α-olefin and cyclic olefin. α-olefin is a monomer derived from C4 to C12 (4 to 12 carbon atoms) α-olefin, and includes, for example, 1-butene, 1-pentene, 1-hexene, 3-methyl-1-butene, 3-methyl-1-pentene, 3-ethyl-1-pentene, 4-methyl-1-pentene, 4-methyl-1-hexene, 4,4-dimethyl-1-hexene, 4,4-dimethyl-1-pentene, 4-ethyl-1-hexene, 3-ethyl-1-hexene, 1-octene, 1-decene, 1-dodecene, etc. Cyclic olefin is a monomer derived from norbornene, and includes, for example, substituents of hydrogen groups, halogen atoms, monovalent or divalent hydrocarbon groups. Among these, unsubstituted norbornene is preferable.

<Vinyl Chloride Resin>

Vinyl chloride resin includes, for example, a copolymer of vinyl chloride and a copolymerizable monomer (hereinafter also referred to as "vinyl chloride copolymer"), a graft copolymer obtained by graft-copolymerizing vinyl chloride to a polymer other than the vinyl chloride copolymer, etc. in addition to a vinyl chloride homopolymer.

The monomer copolymerizable with vinyl chloride includes, for example, α-olefins such as ethylene, propylene, and butylene; vinyl esters such as vinyl acetate and vinyl propionate; vinyl ethers such as butyl vinyl ether and cetyl vinyl ether; unsaturated carboxylic acids such as acrylic acid and methacrylic acid; esters of acrylic acid or methacrylic acid such as methyl acrylate, ethyl methacrylate, and phenyl methacrylate; aromatic vinyls such as styrene and α-methylstyrene; vinyl halides such as vinylidene chloride and vinyl fluoride; N-substituted maleimides such as N-phenylmaleimide and N-cyclohexylmaleimide, etc.

The polymer other than the vinyl chloride copolymer may be any polymer that can graft-copolymerize vinyl chloride, and includes, for example, an ethylene-vinyl acetate copolymer, an ethylene-vinyl acetate-carbon monoxide copolymer, an ethylene-ethyl acrylate copolymer, an ethylene-ethyl acrylate-carbon monoxide copolymer, an ethylene-methyl methacrylate copolymer, an ethylene-propylene copolymer, an acrylonitrile-butadiene copolymer, polyurethane, etc.

A plasticizer can be used for the vinyl chloride resin. The plasticizer includes, for example, phthalate plasticizers such as di-2-ethylhexyl phthalate (DOP), dibutyl phthalate (DBP), diheptyl phthalate (DHP), and diisodecyl phthalate (DIDP); fatty acid ester plasticizers such as di-2-ethylhexyl adipate (DOA), diisobutyl adipate (DIBA), and dibutyl adipate (DBA); epoxidized ester plasticizers such as epoxidized linseed oil, epoxidized soybean oil, epoxidized castor oil, epoxidized safflower oil, epoxidized linseed oil fatty acid butyl, and epoxy octyl stearate; trimellitate ester plasticizers such as tri-2-ethylhexyl trimellitate (TOTM) and triisononyl trimellitate (TINTM); phosphate plasticizers such as trimethyl phosphate (TMP) and triethyl phosphate (TEP), etc. Among these, epoxidized ester plasticizers are preferable considering moldability and workability of the resin sheet.

The melting point of the thermoplastic resin is preferably 120 to 330° C., more preferably 150 to 300° C.
<Ultraviolet Absorbing Polymer>

The ultraviolet absorbing polymer is a polymer having a monomer unit represented by the following general formula (1), a monomer unit represented by the following general formula (2), and a thiol-based chain transfer agent residue, wherein a thiol-based chain transfer agent that forms the thiol-based chain transfer agent residue has a thiol group and one or more moieties that are selected from the group consisting of a carboxyl group, a hydroxyl group, and an ester bond.

[Chemical formula 2]

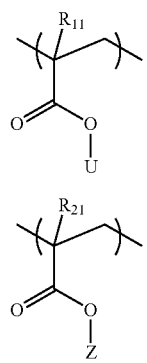

General formula (1)

General formula (2)

In the general formula (1), $R_{11}$ represents any one selected from the group consisting of a hydrogen atom and a methyl group, and U is a hydrocarbon group having a skeleton that absorbs ultraviolet rays and may contain a heteroatom.

In the general formula (2), $R_{21}$ represents any one selected from the group consisting of a hydrogen atom and a methyl group, and Z represents any one selected from the group consisting of a chain hydrocarbon group having 10 or more carbon atoms and a cyclic hydrocarbon group.

<General Formula (1)>

$R_{11}$ represents any one selected from the group consisting of a hydrogen atom and a methyl group, and U is a moiety containing one or more hydrocarbon groups or heterocyclic groups having a skeleton that absorbs ultraviolet rays. Since the monomer unit represented by the general formula (1) has a skeleton that absorbs ultraviolet rays, the ultraviolet absorbing polymer has ultraviolet absorbency. The ultraviolet absorbency comes from the skeleton that absorbs ultraviolet rays.

The monomer unit represented by the general formula (1) is a unit formed by polymerizing the monomer represented by the following general formula (11).

[Chemical formula 3]

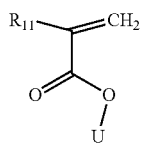

(General formula 11)

In the general formula (11), $R_{11}$ and U are the same as those in the general formula (1).
<Monomer Unit Represented by the General Formula (11)>

In the monomer unit represented by the general formula (11), U is a hydrocarbon group having a skeleton that absorbs ultraviolet rays and may contain a heteroatom. The skeleton that absorbs ultraviolet rays is preferably one selected from the group consisting of a benzotriazole skeleton, a triazine skeleton, and a benzophenone skeleton, for example. Among these, a benzotriazole skeleton is preferable from the viewpoint of cost and industrial availability. The monomer unit for each skeleton that absorbs ultraviolet rays will be described hereinafter.
(Monomer Unit Containing Benzotriazole Skeleton)

In the general formula (11), when U is a benzotriazole skeleton, the monomer units represented by the following chemical formulas (a1-1) to (a1-3-32) are exemplified.

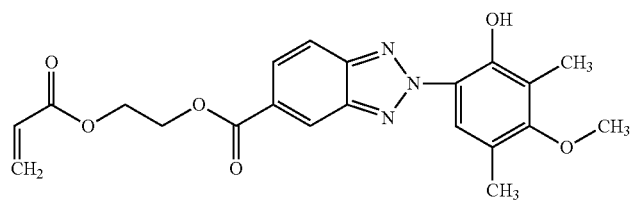

(a1-3-5)

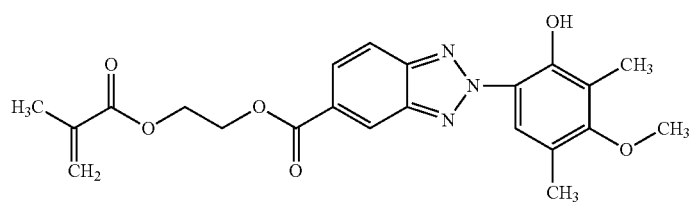

(a1-3-6)

-continued
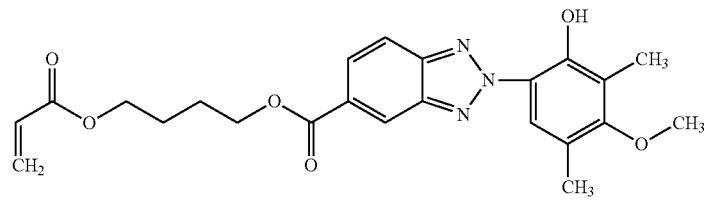
(a1-3-7)
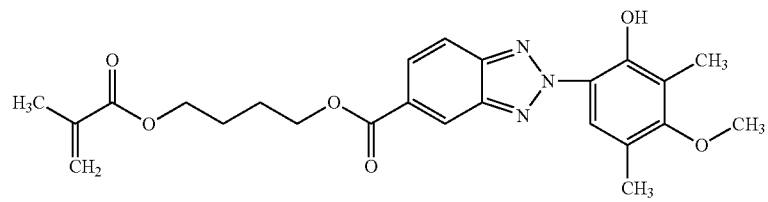
(a1-3-8)
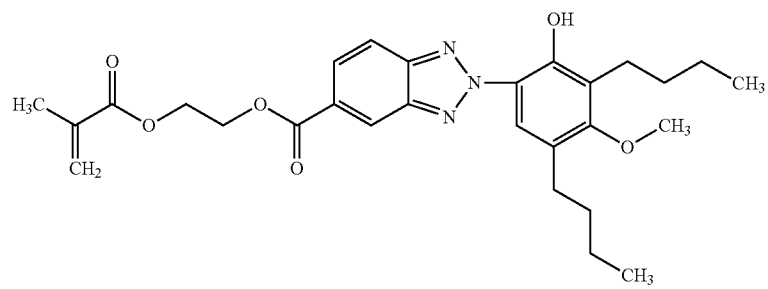
(a1-3-9)
[Chemical formula 10]
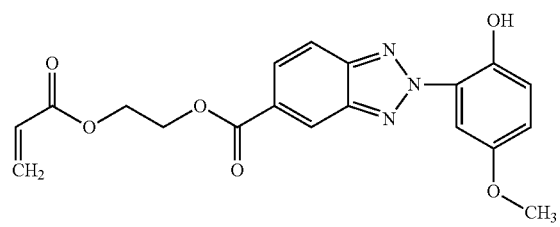
(a1-3-10)
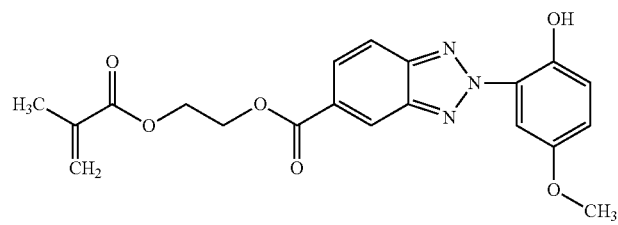
(a1-3-11)
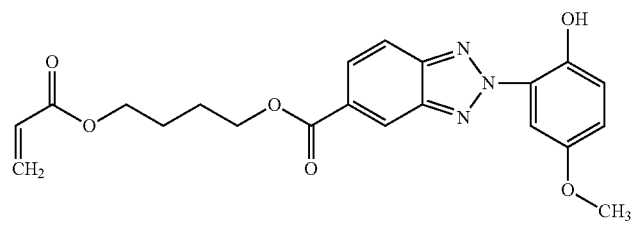
(a1-3-12)

-continued
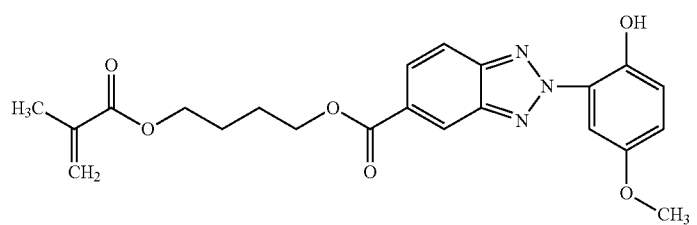
(a1-3-13)
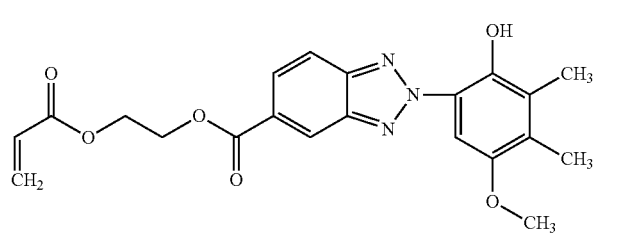
(a1-3-14)
[Chemical formula 11]
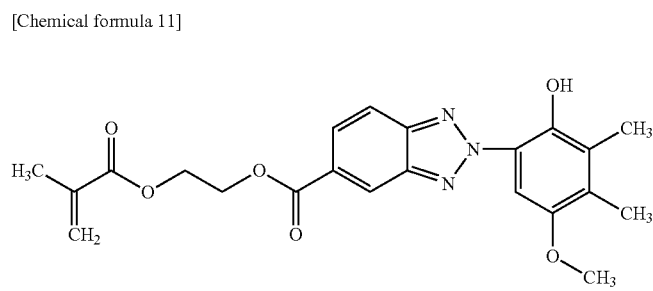
(a1-3-15)
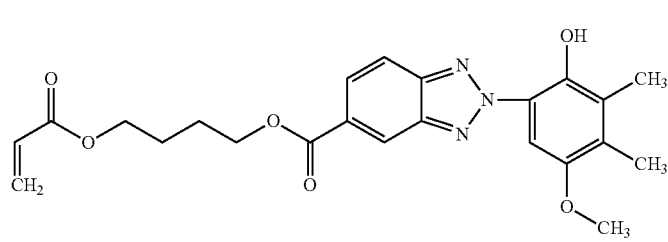
(a1-3-16)
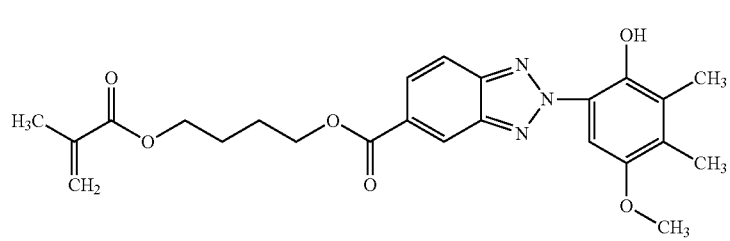
(a1-3-17)
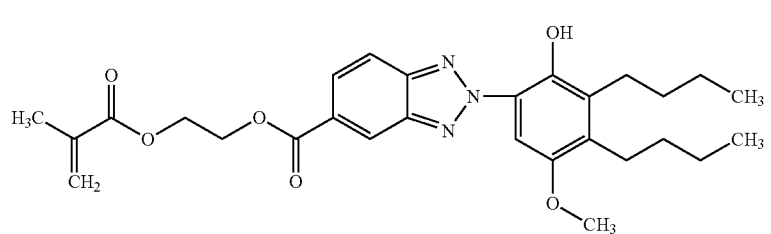
(a1-3-18)
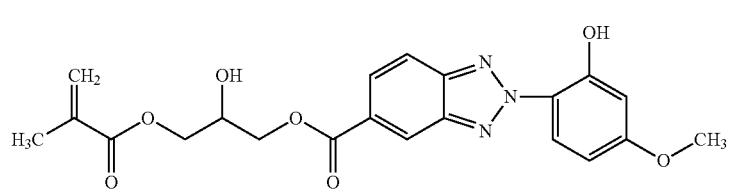
(a1-3-19)

-continued
(a1-3-20)
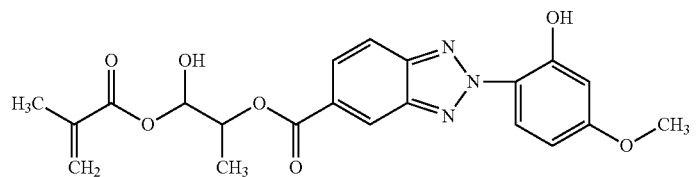
[Chemical formula 12]
(a1-3-21)
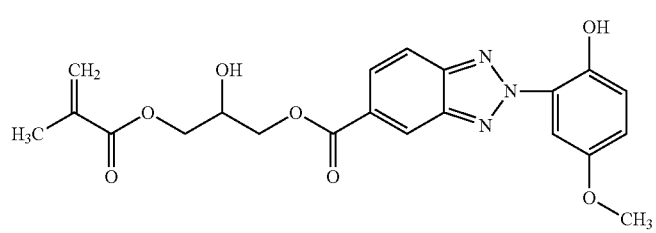
(a1-3-22)
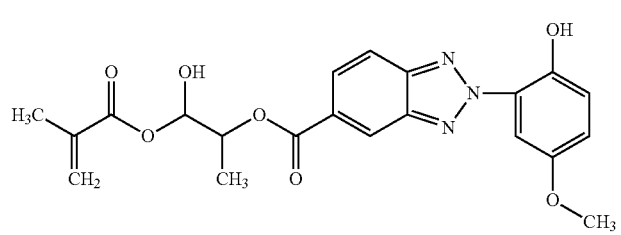
(a1-3-23)
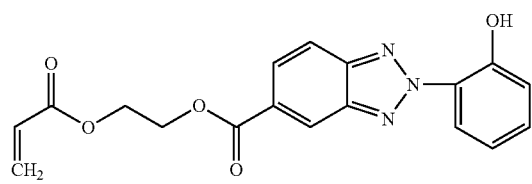
(a1-3-24)
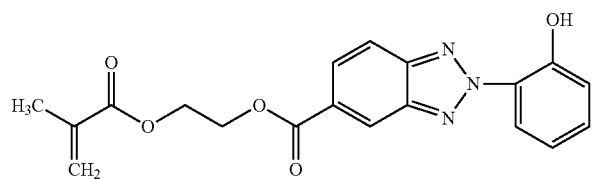
(a1-3-25)
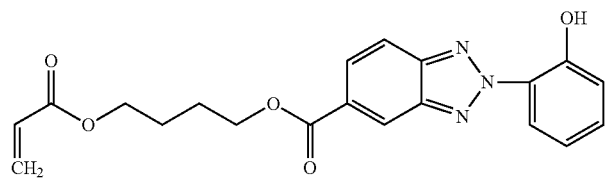
(a1-3-26)
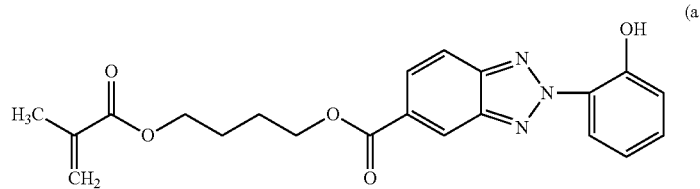

-continued
[Chemical formula 13]
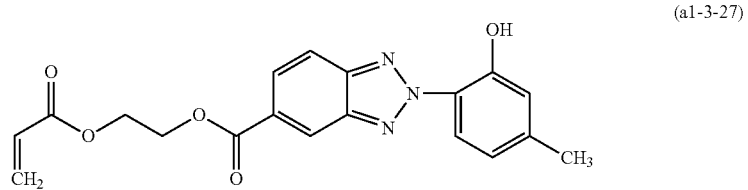
(a1-3-27)
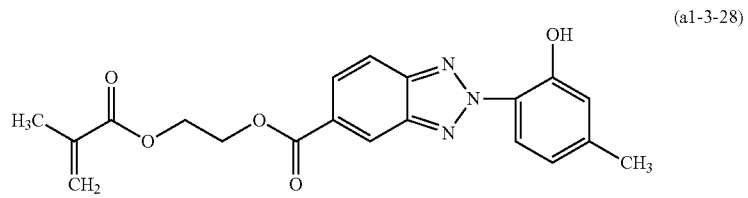
(a1-3-28)
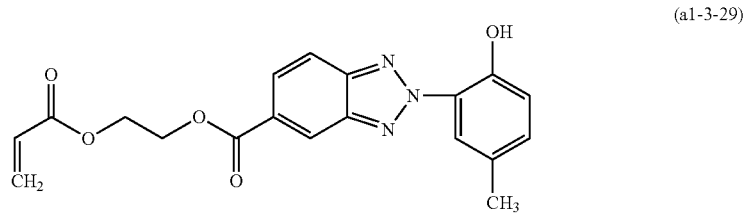
(a1-3-29)
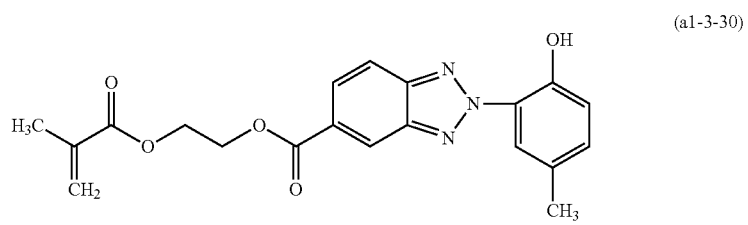
(a1-3-30)
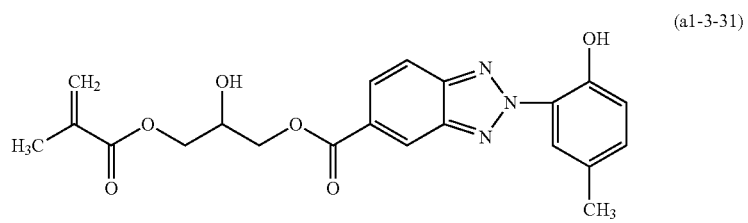
(a1-3-31)
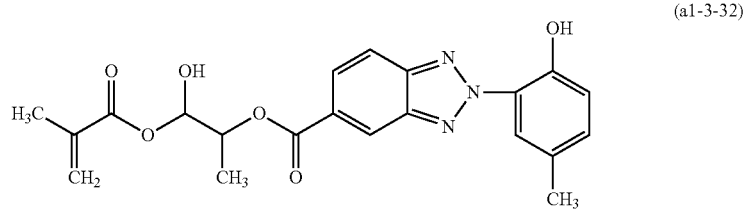
(a1-3-32)

(Monomer Unit Containing Triazine Skeleton)
In the general formula (11), when U is a triazine skeleton, the monomer units represented by the following chemical formulas (a1-4-1) to (a1-4-21) are exemplified. The triazine skeleton is preferably a triphenyltriazine skeleton.
[Chemical formula 14]
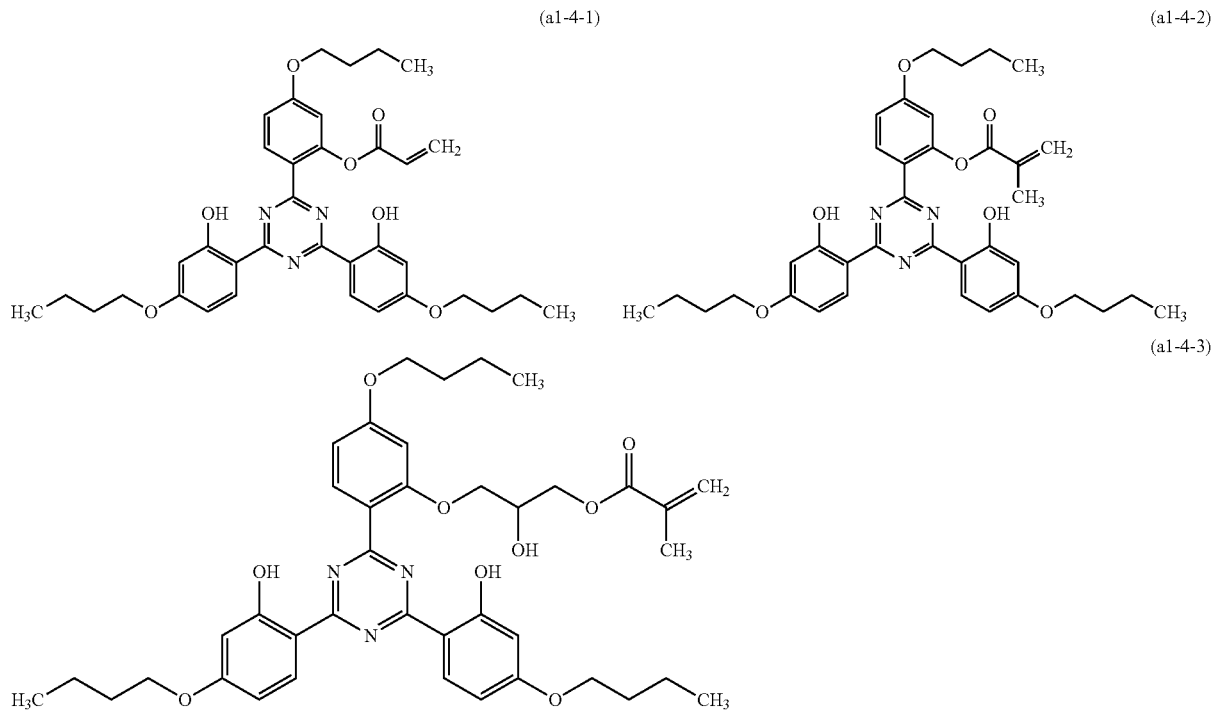
[Chemical formula 15]
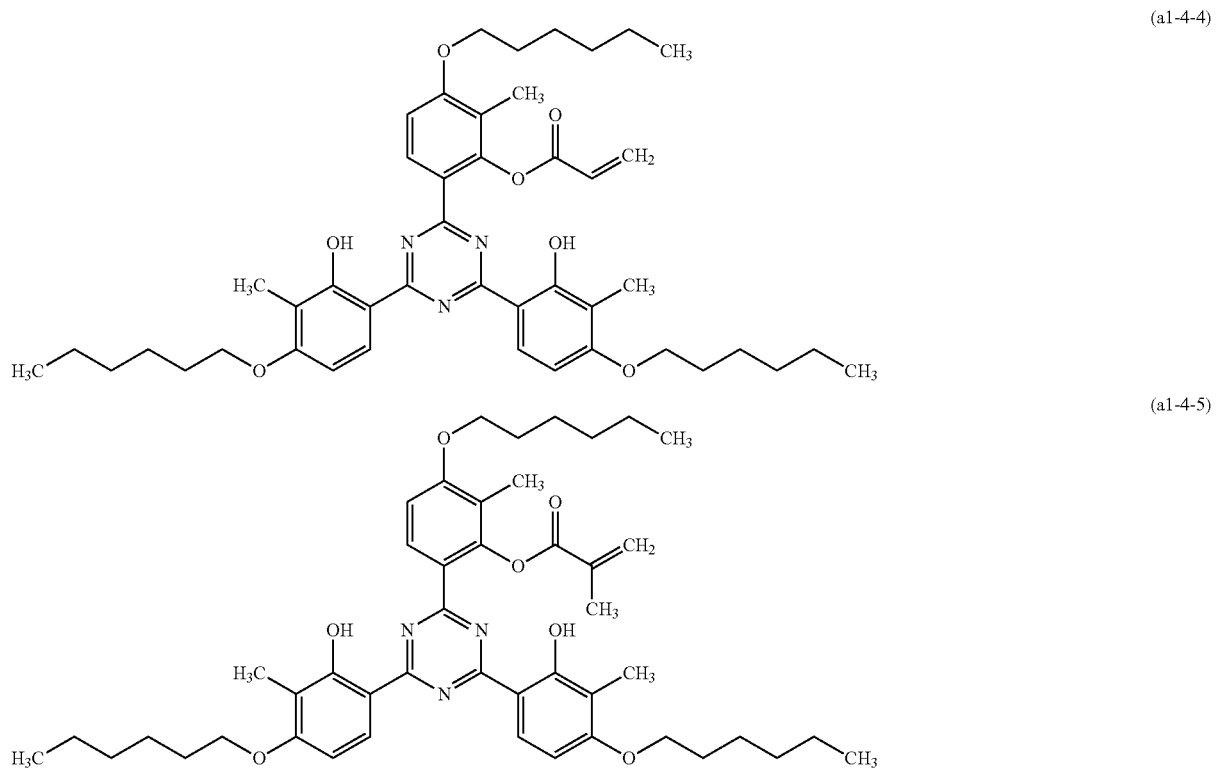

-continued
(a1-4-6)
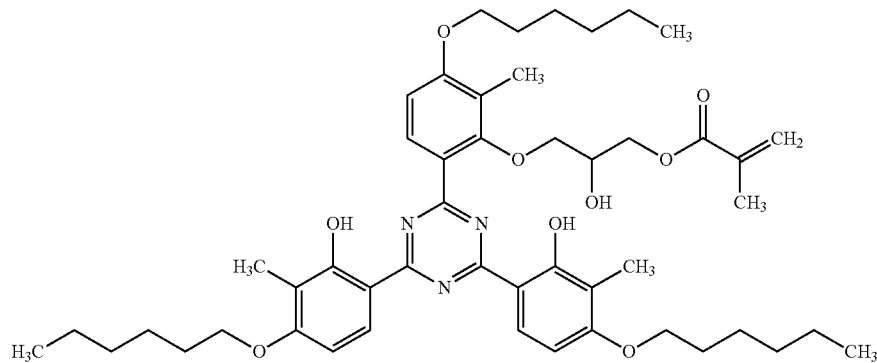
[Chemical formula 16]
(a1-4-7)
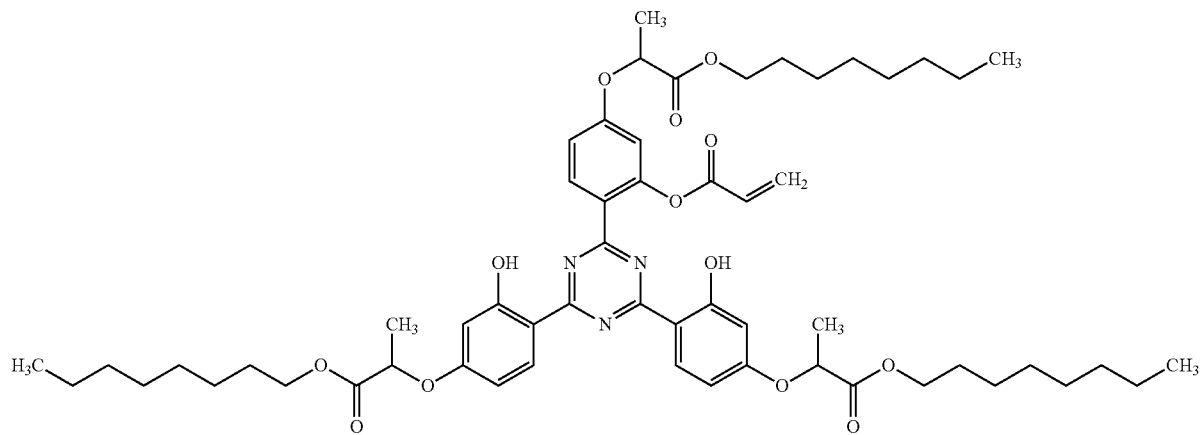
(a1-4-8)
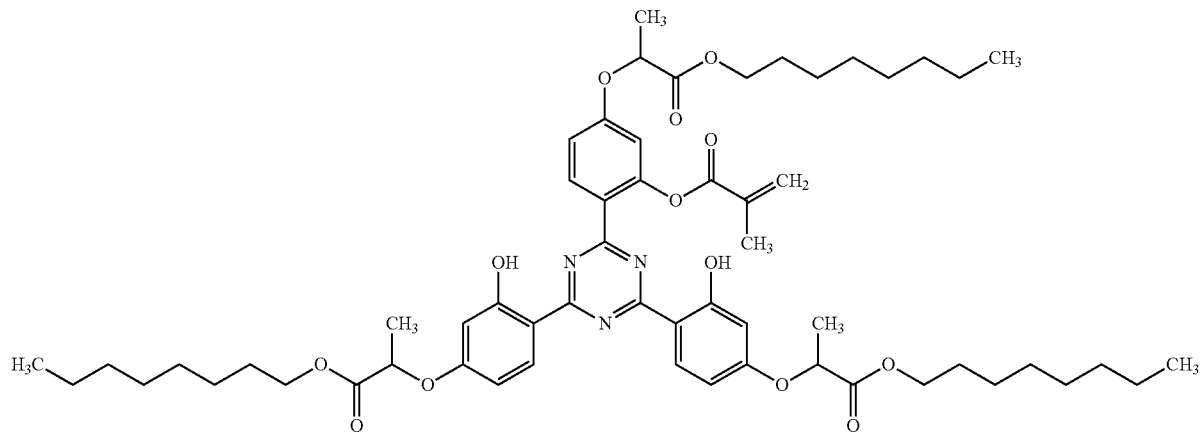

-continued
(a1-4-9)
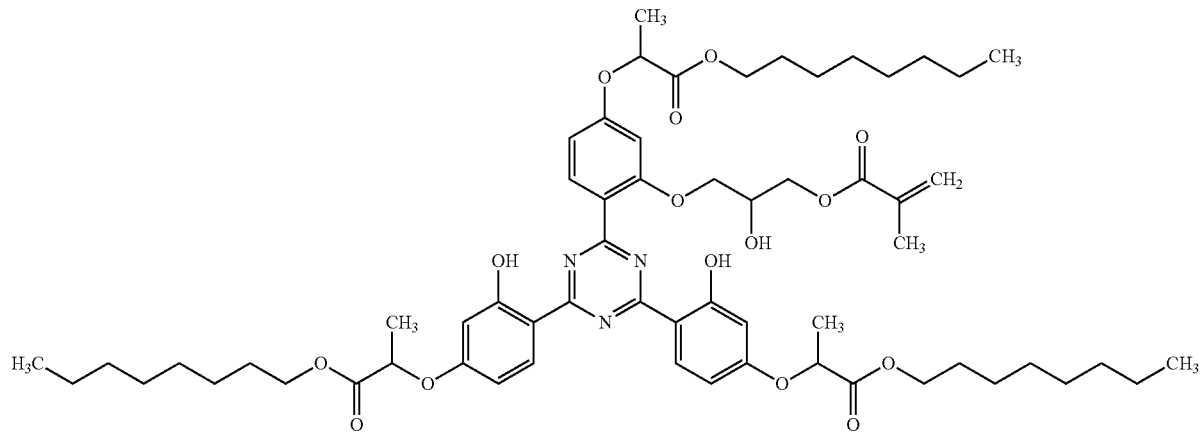
[Chemical formula 17]
(a1-4-10) (a1-4-11)
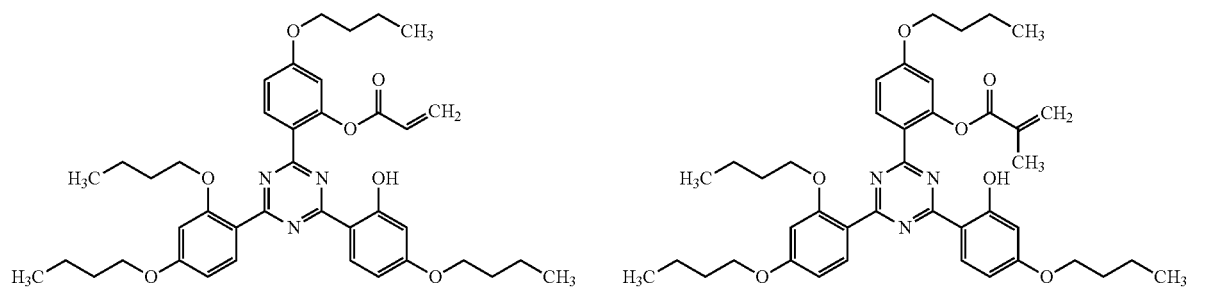
(a1-4-12)
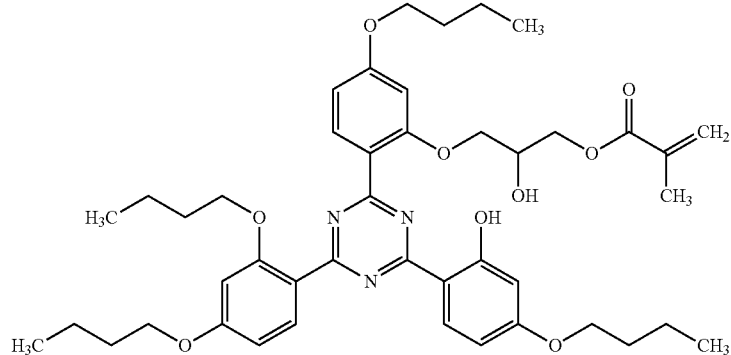
[Chemical formula 18]
(a1-4-13) (a1-4-14)
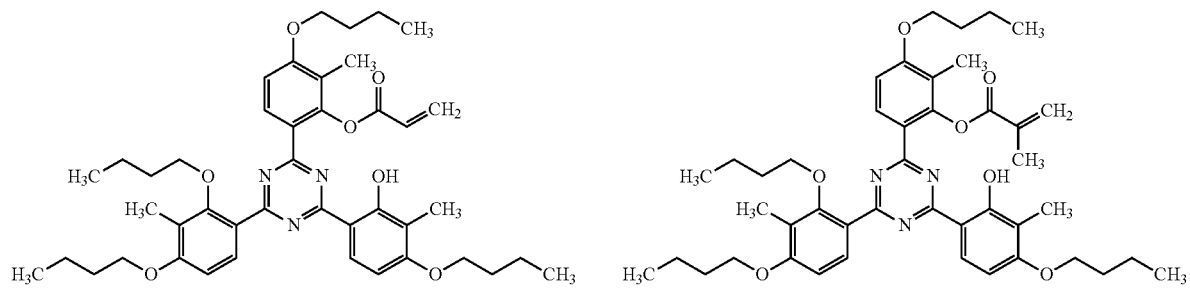

(a1-4-15)
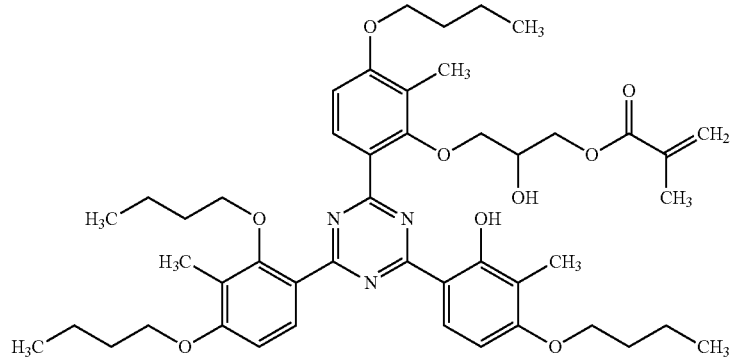
[Chemical formula 19]
(a1-4-16)
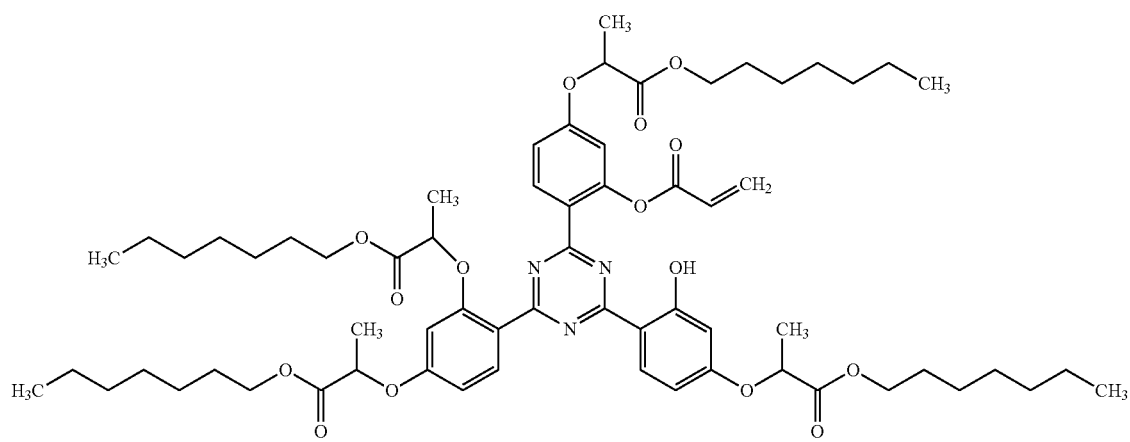
(a1-4-17)
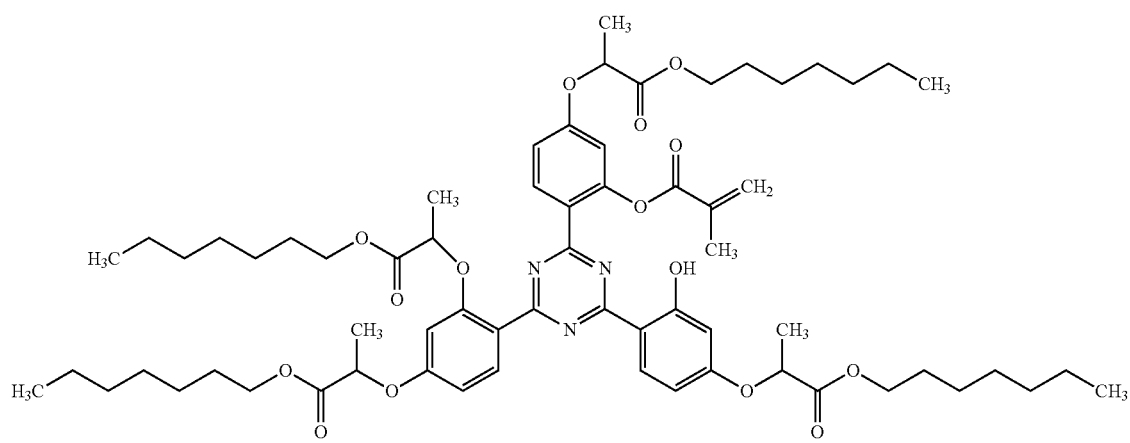

-continued (a1-4-18)

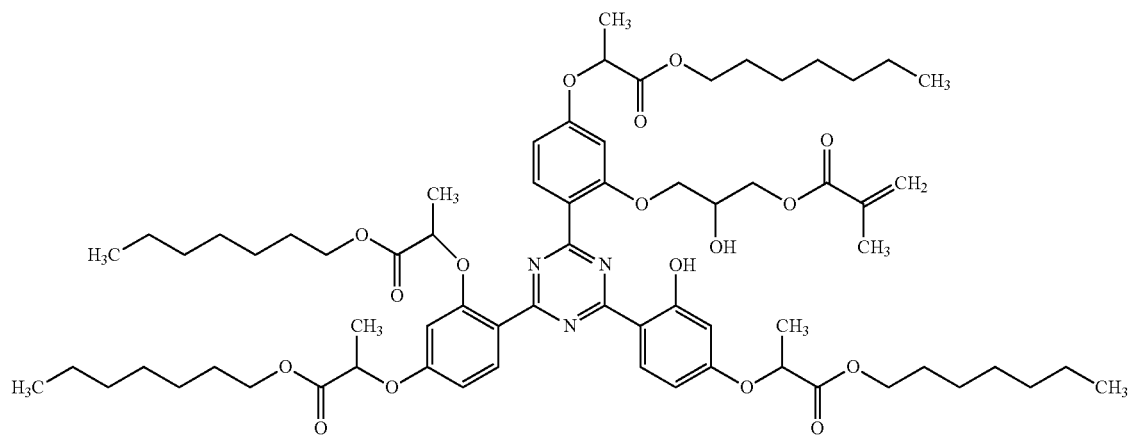

(Monomer Unit Containing Benzophenone Skeleton)

In the general formula (11), when U is a benzophenone skeleton, the following monomers are included. The monomer having a benzophenone skeleton includes, for example, 4-acryloyloxybenzophenone, 4-methacryloyloxybenzophenone, 2-hydroxy-4-acryloyloxybenzophenone, 2-hydroxy-4-methacryloyloxybenzophenone, 2-hydroxy-4-(2-acryloyloxy)ethoxybenzophenone, 2-hydroxy-4-(2-methacryloyloxy)ethoxybenzophenone, 2-hydroxy-4-(2-methyl-2-acryloyloxy)ethoxybenzophenone, 2,2'-dihydroxy-4-methacryloyloxybenzophenone, etc.

Among the compounds represented by the general formula (1), 2-[2-hydroxy-5-[2-(methacryloyloxy)ethyl]phenyl]-2H-benzotriazole is preferable in terms of the balance between polymerization controllability, cost, and ultraviolet absorbency.

The monomer unit represented by the general formula (1) can be used alone or in combination of two or more.

The content of the monomer unit represented by the general formula (1) is preferably 3 to 60% by mass, more preferably 10 to 50% by mass, and even more preferably 15 to 45% by mass, based on 100% by mass of the total monomer unit. By containing an appropriate amount, it is possible to achieve both ultraviolet absorbency and compatibility with polyolefin at a high level.

<General Formula (2)>

In the general formula (2), $R_{21}$ represents any one selected from the group consisting of a hydrogen atom and a methyl group, and Z represents any one selected from the group consisting of a chain hydrocarbon group and a cyclic hydrocarbon group having 10 or more carbon atoms.

General Formula (2)

[Chemical formula 21]

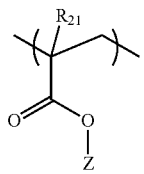

The monomer unit represented by the general formula (2) is a unit formed by polymerizing the monomer represented by the following general formula (21).

General formula (21)

[Chemical formula 22]

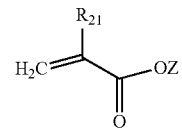

In the general formula (21), $R_{21}$ and Z are the same as those in the general formula (2).

Hydrophobicity increases when Z is any one selected from a chain hydrocarbon group and a cyclic hydrocarbon group having 10 or more carbon atoms. As a result, the ultraviolet absorbing polymer has an improved affinity with highly hydrophobic polyolefin, and thus the compatibility between them is improved. Although the upper limit of the number of carbon atoms of Z is not limited, it is preferably 30 or less, more preferably 22 or less, and even more preferably 20 or less if defined.

In the general formula (21), the chain hydrocarbon group having 10 or more carbon atoms may have a straight chain structure or a branched structure. The chain hydrocarbon group includes, for example, an alkyl group such as a decyl group, an undecyl group, a dodecyl group, a tridecyl group, a tetradecyl group, a pentadecyl group, a hexadecyl group, a heptadecyl group, an octadecyl group, a nonadecyl group, an icosyl group, a henicosyl group, a docosyl group, a tricosyl group, and a tetracosyl group. The chain hydrocarbon group preferably has a branched structure, and is more preferably an isostearyl group. In addition, the number of carbon atoms of the hydrocarbon group having a straight chain structure and a branched structure is preferably 14 or more. The upper limit of the hydrocarbon is not limited as long as it can be polymerized, but it is preferable 22 or less.

The hydrocarbon group having a cyclic structure (cyclic hydrocarbon group) includes an alicyclic hydrocarbon group and a polycyclic hydrocarbon group. The alicyclic hydrocarbon group is a group having one saturated or unsaturated carbocyclic ring without aromaticity, and the polycyclic hydrocarbon group is a group having a plurality of saturated or unsaturated carbocyclic rings without aromaticity.

The alicyclic hydrocarbon group includes, for example, a cyclododecyl group, a t-butylcyclohexyl group, etc.

The polycyclic hydrocarbon group includes, for example, an isobornyl group, a dicyclopentanyl group, a dicyclopentenyl group, a 2-methyl-2-adamantyl group, a 2-ethyl-2-adamantyl group, etc. These alicyclic hydrocarbon group and polycyclic hydrocarbon group are preferably polycyclic hydrocarbon groups, more preferably dicyclopentanyl groups. As a result, the affinity with highly hydrophobic polyolefin and cycloolefin resin is particularly improved.

The monomer represented by the general formula (21) includes, for example, lauryl (meth)acrylate, isobornyl (meth)acrylate, stearyl (meth)acrylate, isostearyl (meth)acrylate, behenyl (meth)acrylate, dicyclopentanyl (meth)acrylate, dicyclopentenyl (meth)acrylate, isobornyl (meth)acrylate, 2-methyl-2-adamantyl (meth)acrylate, 2-ethyl-2-adamantyl (meth)acrylate, t-butylcyclohexyl (meth)acrylate, etc. Among these, isostearyl (meth)acrylate, dicyclopentanyl (meth)acrylate, dicyclopentenyl (meth)acrylate, and isobornyl (meth)acrylate are preferable, and dicyclopentanyl (meth)acrylate is more preferable.

The monomer unit represented by the general formula (21) can be used alone or in combination of two or more. In addition, the ultraviolet absorbing polymer is preferably a cyclic hydrocarbon group monomer unit, or a combination of a chain hydrocarbon group monomer unit and a cyclic hydrocarbon group monomer so that the glass transition temperature thereof does not decrease too much. Regarding the combination, it is preferable to use a chain hydrocarbon group monomer and a cyclic hydrocarbon group monomer at a ratio of 1:1 to 1:3. As a result, the affinity with polyolefin and cycloolefin resin is further improved.

The content of the monomer unit represented by the general formula (21) is preferably 30 to 85% by mass, more preferably 35 to 80% by mass, and most preferably 40 to 75% by mass, based on the total monomer unit. By containing an appropriate amount, it is easy to achieve both ultraviolet absorbency and compatibility with polyolefin.

<Other Monomer Units>

The ultraviolet absorbing polymer can contain monomer units other than the monomer unit represented by the general formula (1) and the monomer unit represented by the general formula (2). Other monomer units can contain, for example, a (meth)acrylic acid ester unit, an aromatic vinyl monomer unit, and other vinyl monomer units.

(Meth)acrylic acid ester includes, for example, methyl (meth)acrylate, ethyl (meth)acrylate, n-propyl (meth)acrylate, isopropyl (meth)acrylate, n-butyl (meth)acrylate, isobutyl (meth)acrylate, t-butyl (meth)acrylate, n-hexyl (meth)acrylate, cyclohexyl (meth)acrylate, 2-ethylhexyl (meth)acrylate, t-octyl (meth)acrylate, acetoxyethyl (meth)acrylate, phenyl (meth)acrylate, 2-hydroxyethyl (meth)acrylate, 2-methoxyethyl (meth)acrylate, 2-ethoxyethyl (meth)acrylate, 2-(2-methoxyethoxy)ethyl (meth)acrylate, 3-phenoxy-2-hydroxypropyl (meth)acrylate, benzyl (meth)acrylate, (meth)acrylate diethylene glycol monomethyl ether, (meth)acrylate diethylene glycol monoethyl ether, (meth)acrylate triethylene glycol monomethyl ether, triethylene glycol monoethyl ether (meth)acrylate, polyethylene glycol monomethyl ether (meth)acrylate, polyethylene glycol monoethyl ether (meth)acrylate, β-phenoxyethoxyethyl (meth)acrylate, nonylphenoxypolyethylene glycol (meth)acrylate, trifluoroethyl (meth)acrylate, octafluoropentyl (meth)acrylate, perfluorooctylethyl (meth)acrylate, tribromophenyl (meth)acrylate, tribromophenyloxyethyl (meth)acrylate, etc.

The aromatic vinyl monomer includes, for example, styrene, α-methylstyrene, vinyl benzoate, vinyl methyl benzoate, vinyl toluene, dimethylstyrene, trimethylstyrene, ethylstyrene, isopropylstyrene, butylstyrene, hydroxystyrene, methoxystyrene, butoxystyrene, acetoxystyrene, chlorostyrene, dichlorostyrene, bromostyrene, chloromethylstyrene, hydroxystyrene protected with a group that can be deprotected by an acidic substance (for example, tert-butoxycarbonyl group (t-Boc), etc.), etc.

Other vinyl monomer units include, for example, crotonate ester, vinyl ester, maleate diester, fumarate diester, itaconate diester, (meth)acrylamide, vinyl ether, (meth)acrylonitrile, an acidic group-containing monomer, a nitrogen-containing heterocyclic monomer, etc.

Crotonate ester includes, for example, butyl crotonate, hexyl crotonate, etc.

Vinyl ester includes, for example, vinyl acetate, vinyl propionate, vinyl butyrate, vinyl methoxy acetate, etc.

Maleate diester includes, for example, dimethyl maleate, diethyl maleate, dibutyl maleate, etc.

Fumarate diester includes, for example, dimethyl fumarate, diethyl fumarate, dibutyl fumarate, etc.

Itaconate diester includes, for example, dimethyl itaconate, diethyl itaconate, dibutyl itaconate, etc.

(Meth)acrylamide includes, for example, (meth)acrylamide, N-methyl (meth)acrylamide, N-ethyl (meth)acrylamide, N-propyl (meth)acrylamide, N-isopropyl (meth)acrylamide, N-n-butyl (meth)acrylamide, N-t-butyl (meth)acrylamide, N-cyclohexyl (meth)acrylamide, N-(2-methoxyethyl)(meth)acrylamide, N,N-dimethyl (meth)acrylamide, N,N-diethyl (meth)acrylamide, N-phenyl(meth)acrylamide, N-benzyl (meth)acrylamide, (meth)acryloylmorpholine, diacetoneacrylamide, etc.

Vinyl ether includes, for example, methyl vinyl ether, butyl vinyl ether, hexyl vinyl ether, methoxyethyl vinyl ether, etc.

The acidic group-containing monomer includes, for example, unsaturated monocarboxylic acids such as acrylic acid, methacrylic acid, crotonic acid, α-chloroacrylic acid, cinnamic acid; unsaturated dicarboxylic acids such as maleic acid, maleic anhydride, fumaric acid, itaconic acid, itaconic anhydride, citraconic acid, citraconic anhydride, mesaconic acid, or acid anhydrides thereof; etc.

The nitrogen-containing heterocyclic monomer includes, for example, 4-(meth)acryloyloxy-2,2,6,6-tetramethylpiperidine, 4-(meth)acryloylamino-2,2,6,6-tetramethylpiperidine, pentamethylpiperidinyl methacrylate, pentamethylpiperidinyl acrylate, 4-(meth)acryloylamino-1,2,2,6,6-pentamethylpiperidine, 4-cyano-4-(meth)acryloylamino-2,2,6,6-tetramethylpiperidine, 4-crotonoyloxy-2,2,6,6-tetramethylpiperidine, 4-crotonylamino-2,2,6,6-tetramethylpiperidine, etc.

The ultraviolet absorbing polymer containing the nitrogen-containing heterocyclic monomer unit is preferable for the nitrogen-containing heterocyclic ring improves photostability. The nitrogen-containing heterocyclic monomer is preferably 3 to 40% by mass, more preferably 3 to 30% by mass, and even more preferably 5 to 250% by mass, in 100% by mass of the monomer mixture. By containing an appropriate amount, it is easy to achieve both photostability and compatibility with polyolefin and cycloolefin resin.

<Synthesis Method>

A method of synthesizing the ultraviolet absorbing polymer includes, for example, anionic polymerization, living anionic polymerization, cationic polymerization, living cationic polymerization, free radical polymerization, living radical polymerization, etc. Among these, the ultraviolet absorbing polymer synthesized by free radical polymerization is preferable from the viewpoint of cost and productivity.

The weight average molecular weight (Mw) of the ultraviolet absorbing polymer is preferably 3,000 to 150,000, more preferably 4,000 to 100,000, even more preferably 5,000 to 80,000, and particularly preferably 6,000 to 40,000, from the viewpoint of compatibility with polyolefin and cycloolefin resin. When the weight average molecular weight (Mw) of the ultraviolet absorbing polymer is within the above range, the fluidity at the time of molding is further improved. In addition, the weight average molecular weight is a numerical value measured by Gel Penetration Chromatography (GPC).

The molecular weight distribution (Mw/Mn) of the ultraviolet absorbing polymer is preferably 1 to 10, more preferably 1.2 to 5.0, and even more preferably 1.3 to 3.0. Within the above range, the compatibility with polyolefin and cycloolefin resin is improved, and the ultraviolet absorbing polymer is less likely to bleed out.

The glass transition temperature (Tg) of the ultraviolet absorbing polymer is preferably 60° C. to 180° C., more preferably 70° C. to 170° C., and even more preferably 80° C. to 160° C. Within the above range, the workability and the compatibility with the polyolefin and cycloolefin resin are well balanced.

Although the thermal decomposition temperature (Td) of the ultraviolet absorbing polymer is not particularly limited, it is, for example, 200° C. or higher, preferably 220° C. or higher, and more preferably 240° C. or higher. Within the above range, yellowing or the like is less likely to occur even during molding at a high temperature.

In addition, Tg and Td can be measured, for example, by the method described later.

<Thiol-Based Chain Transfer Agent>

The ultraviolet absorbing polymer has a thiol-based chain transfer agent residue. The thiol-based chain transfer agent residue has a thiol group and one or more moieties selected from a carboxyl group, a hydroxyl group, and an ester bond. The polymer molecular weight adjusting effect of the thiol-based chain transfer agent is known. Regarding this, in this specification, in addition to the above effect, the terminal thiol-based chain transfer agent residue of the ultraviolet absorbing polymer has one or more moieties selected from a carboxyl group, a hydroxyl group, and an ester bond, which improves the affinity between the polymer and lower alcohols that are inexpensive and easy to remove. As a result, it is possible to use lower alcohols in the purification process for removing the low molecular weight polymer and unreacted thiol-based chain transfer agent from the ultraviolet absorbing polymer, and the unexpected effect of simple purification at low cost is achieved.

The thiol-based chain transfer agent is preferably a monothiol compound rather than a polythiol compound, and more preferably a monothiol compound having a primary thiol group, in terms of molecular weight adjustment. As a result, an ultraviolet absorbing polymer with few impurities can be obtained, which is suitable for use on pharmaceutical agents and cosmetics, for example.

The thiol-based chain transfer agent having a carboxyl group includes, for example, α-mercaptopropionic acid, β-mercaptopropionic acid, 2,3-dimercaptopropionic acid, thioglycolic acid, thiolactic acid o-mercaptobenzoic acid, m-mercaptobenzoic acid, thiomalic acid, o-thiocoumaric acid, α-mercaptobutanoic acid, β-mercaptobutanoic acid, γ-mercaptobutanoic acid, 11-mercaptoundecanoic acid, etc.

The thiol-based chain transfer agent having a hydroxyl group includes, for example, mercaptoethanol, 1-mercaptoethanol, 2-mercaptoethanol, 1-mercaptopropanol, 3-mercaptopropanol, 1-mercapto-2,3-propanediol, 1-mercapto-2-butanol, 1-mercapto-2,3-butanediol, 1-mercapto-3,4-butanediol, 1-mercapto-3,4,4'-butanetriol, 2-mercapto-3-butanol, 2-mercapto-3,4-butanediol and 2-mercapto-3,4,4'-butanetriol, thioglycerol, etc.

The thiol-based chain transfer agent having an ester bond includes, for example, thioglycolic acid alkyl esters such as methyl thioglycolate, octyl thioglycolate, methoxybutyl thioglycolate, mercaptopropionic acid alkyl esters such as methyl mercaptopropionate, octyl mercaptopropionate, methoxybutyl mercaptopropionate, and tridecyl mercaptopropionate, etc.

The molecular weight of the thiol-based chain transfer agent is preferably 101 to 300, and more preferably 150 to 250. By using the thiol-based chain transfer agent within this range, the volatility of the thiol-based chain transfer agent itself is suppressed, and a chain transfer effect can be obtained with addition of a small amount, so it is easy to control the molecular weight.

Among these, a compound having a primary thiol group is particularly preferable for it has a high chain transfer agent effect and facilitates molecular weight adjustment. In particular, β-mercaptopropionic acid, thioglycerol, octyl thioglycolate, methoxybutyl thioglycolate, octyl mercaptopropionate, and methoxybutyl mercaptopropionate are preferable in terms of balance between odor and ease of molecular weight adjustment.

The thiol-based chain transfer agent can be used alone or in combination of two or more.

The content of the thiol-based chain transfer agent is preferably 0.01 to 5 parts by mass, preferably 0.05 to 4 parts by mass, and more preferably 0.1 to 3 parts by mass, with respect to 100 parts by mass of the total monomer units of the ultraviolet absorbing polymer. When an appropriate amount is contained, both molecular weight adjustment and affinity with lower alcohols can be achieved at a high level. The thiol-based chain transfer agent is not included in the total monomer units.

The ultraviolet absorbing polymer preferably contains 0.001 to 0.3 parts by mass of sulfur atoms derived from the thiol-based chain transfer agent, more preferably 0.001 to 0.25 parts by mass, and even more preferably 0.001 to 0.2 parts by mass, with respect to 100 parts by mass of the total monomer units. When an appropriate amount is contained, both molecular weight adjustment and affinity with lower alcohols can be achieved at a high level. The content of sulfur atoms derived from the thiol-based chain transfer agent in the ultraviolet absorbing polymer can be measured by the method described later. Specifically, it is calculated by burning the ultraviolet absorbing polymer and measuring the amount of sulfur-containing gas emitted.

The ultraviolet absorbing polymer can be synthesized by a known polymerization method such as solution polymerization, emulsion polymerization, suspension polymerization, bulk polymerization, etc., but in this specification, solution polymerization that facilitates reaction control is preferable.

Furthermore, random polymerization, block polymerization, etc. can be suitably selected for polymerization, and radical polymerization is preferable among ionic polymerization, radical polymerization, etc.

<Polymerization Initiator>

A polymerization initiator is preferably used for synthesizing the ultraviolet absorbing polymer. The polymerization initiator is preferably an azo-based compound and a peroxide, for example. The azo-based compound includes, for example, 2,2'-azobisisobutyronitrile, 2,2'-azobis(2-methylbutyronitrile), 1,1'-azobis(cyclohexane 1-carbonitrile), 2,2'- azobis(2,4-dimethylvaleronitrile), 2,2'-azobis(2,4-dimethyl-4-methoxyvaleronitrile), dimethyl 2,2'-azobis(2-methylpropionate), 4,4'-azobis (4-cyanovaleric acid), 2,2'-azobis(2-hydroxymethylpropionitrile), or 2,2'-azobis[2-(2-imidazolin-2-yl)propane], etc. The peroxide includes, for example, benzoyl peroxide, t-butyl perbenzoate, cumene hydroperoxide, diisopropyl peroxydicarbonate, di-n-propyl peroxydicarbonate, di(2-ethoxyethyl) peroxydicarbonate, t-butyl peroxyneodecanoate, t-butyl peroxybivalate, (3,5,5-trimethylhexanoyl) peroxide, dipropionyl peroxide, or diacetyl peroxide, etc.

The polymerization initiator can be used alone or in combination of two or more.

The polymerization temperature is preferably about 40 to 150° C., and more preferably 50 to 110° C. The reaction time is preferably about 3 to 30 hours, and more preferably 5 to 20 hours.

<Organic Solvent>

An organic solvent can be used to synthesize the ultraviolet absorbing polymer. The organic solvent includes, for example, ethyl acetate, n-butyl acetate, isobutyl acetate, toluene, xylene, acetone, hexane, methyl ethyl ketone, cyclohexanone, propylene glycol monomethyl ether acetate, dipropylene glycol monomethyl ether acetate, ethylene glycol monoethyl ether acetate, ethylene glycol monobutyl ether acetate, diethylene glycol monoethyl ether acetate, or diethylene glycol monobutyl ether acetate, etc.

In addition, methanol is preferably used as the solvent to be used in the purification process of the ultraviolet absorbing polymer considering low solubility in the ultraviolet absorbing polymer, cost, purity, and ease of solvent removal from the ultraviolet absorbing polymer.

The organic solvent can be used alone or in combination of two or more.

<Resin Composition for Molding>

The resin composition for molding contains a thermoplastic resin and an ultraviolet absorbing polymer. A colorant and an additive can be contained as necessary. The blending amount of the ultraviolet absorbing polymer is preferably 0.01 to 30 parts by mass, preferably 0.05 to 25 parts by mass, and more preferably 0.1 to 20 parts by mass, with respect to 100 parts by mass of the thermoplastic resin.

<Wax>

The resin composition for molding can contain wax.

The wax consists of low molecular weight polyolefins. These are polymers of olefinic monomers such as ethylene, propylene, butylene, and may be block, random copolymers, or terpolymers. Specifically, these are polymers of α-olefins such as low-density polyethylene (LDPE), high-density polyethylene (HDPE), and polypropylene (PP). These can be used alone or in combination of two or more.

The number average molecular weight of the wax is preferably 1,000 to 30,000, and more preferably 2,000 to 25,000. Within this range, the wax moderately migrates to the surface of the molded body, so that the balance between slidability and suppression of bleeding out is excellent.

The melting point of the wax is preferably 60 to 150° C., and more preferably 70 to 140° C. Within this range, the workability during melt-kneading the thermoplastic resin and the wax is good.

The melt flow rate (MFR) of the wax determined according to JIS K-7210 is preferably greater than 100 g/10 minutes.

The blending amount of the wax is preferably 0.1 to 10 parts by mass with respect to 100 parts by mass of the thermoplastic resin contained in the molded body.

The resin composition for molding can be produced, for example, at the composition ratio of the molded body. Alternatively, it can be produced as a masterbatch containing a high concentration of the ultraviolet absorbing polymer. In this specification, a masterbatch is preferable for it facilitates uniform dispersion of the ultraviolet absorbing polymer in the molded body.

Preferably, the masterbatch is obtained by melt-kneading the thermoplastic resin and the ultraviolet absorbing polymer and then molding them into an arbitrary shape, for example. Next, the masterbatch and a diluent resin (for example, the thermoplastic resin used in the masterbatch) can be melt-kneaded to form a molded body having a desired shape. The shape of the masterbatch includes, for example, pellets, powder, a plate, and so on. In order to prevent aggregation of the ultraviolet absorbing polymer, it is preferable to melt-knead the ultraviolet absorbing polymer and the wax in advance to produce a dispersion, and then produce the masterbatch by melt-kneading together with the thermoplastic resin. The apparatus used for the dispersion is preferably a blend mixer, a three-roll mill, or the like, for example.

The thermoplastic resin used to prepare the masterbatch is preferably the same thermoplastic resin as the diluent resin (Y), but other thermoplastic resins may be used as long as compatibility is not a problem.

When producing the resin composition for molding as a masterbatch, it is preferable to blend 1 to 200 parts by mass, more preferably 5 to 70 parts by mass, of the ultraviolet absorbing polymer with respect to 100 parts by mass of the thermoplastic resin. The mass ratio of the masterbatch (X) and the diluent resin (Y), which is the base material resin of the molded body, is preferably $X/Y=1/1$ to $1/100$, and more preferably 1/3 to 2/100. Within this range, the ultraviolet absorbing polymer is uniformly dispersed in the molded body, and good ultraviolet absorbency and light transmittance are easily obtained.

The melt-kneading includes, for example, use of a single-screw kneading extruder, a twin-screw kneading extruder, a tandem-type twin-screw kneading extruder, etc. The melt-kneading temperature varies depending on the type of thermoplastic resin, but is usually about 150 to 250° C.

The resin composition for molding can further contain an antioxidant, a light stabilizer, a dispersant, etc. as necessary.

<Molded Body>

The resin composition for molding is preferably used for food packaging materials, pharmaceutical packaging materials, and display applications, for example. Food packaging materials and pharmaceutical packaging materials preferably use polyolefin and polyester, for example, as thermoplastic resin. These molded bodies have improved flexibility and visibility, and can suppress deterioration of the contents. As a result, the shelf life of pharmaceuticals, cosmetics, etc. can be extended. In addition, for display applications (for example, televisions, personal computers, smartphones, etc.), it is preferable to use polyacryl and polycarbonate, for example, as the thermoplastic resin. These molded bodies can suppress adverse effects on the eyes by absorbing ultraviolet rays contained in the backlight and light in the short wavelength region of visible light, and also can suppress deterioration of the display elements of the display by absorbing ultraviolet rays contained in the sunlight and light in the short wavelength region of visible light, and further can suppress deterioration of transparency due to migration. Furthermore, the molded bodies can be widely used for applications such as display materials, sensor materials, and optical control materials.

When the resin composition for molding is a masterbatch, the molded body contains the diluent resin (Y). The molded body is produced by molding the resin composition for molding.

The molding method includes, for example, extrusion molding, injection molding, blow molding, etc. Extrusion molding includes, for example, compression molding, pipe extrusion molding, laminate molding, T-die molding, inflation molding, melt spinning, etc.

The molding temperature is usually 160 to 280° C. according to the softening point of the diluent resin.

The molded body can be widely used for applications such as medical drugs, cosmetics, food containers, packaging materials, miscellaneous goods, textile products, pharmaceutical containers, various industrial coating materials, automotive parts, home appliances, building materials for housing, and toiletry products. The molded body is an article obtained by putting the resin into a mold. The molded body includes an article obtained by putting the resin into a mold and an article obtained without using a mold such as a plastic film.

EXAMPLES

The disclosure will be described in more detail hereinafter with reference to experimental examples, but the disclosure is not limited to the experimental examples. In addition, "part" is "parts by mass" and "%" is "% by mass."
(Molecular Weight)

The number average molecular weight (Mn) and the weight average molecular weight (Mw) were measured by Gel Penetration Chromatography (GPC) equipped with an RI (refractive index) detector. The measurement was carried out at the flow rate of 0.35 ml/min by using HLC-8320GPC (manufactured by Tosoh Corporation) as the apparatus, connecting two separation columns in series, using "TSK-GEL SUPER HZM-N" by connecting two for both fillers, setting the oven temperature to 40° C., and using a THF (tetrahydrofuran) solution as the eluent. The sample was dissolved in a solvent consisting of 1 wt % of the above eluent and injected in an amount of 20 microliters. All molecular weights are polystyrene equivalent values.
(Non-Volatile Content)

The non-volatile content was calculated from the weight ratio before and after drying in an electric oven for 10 minutes at 200° C. atmosphere by weighing 0.5 g of the sample in an aluminum container.

Non-volatile content %=(weight after drying)/ (weight before drying)×100

Production Examples (B-1) to (B-11) of the Ultraviolet Absorbing Polymer (Ultraviolet Absorbing Polymer (B-1))

250 parts of methyl ethyl ketone, 30 parts of 2-[2-hydroxy-5-[2-(methacryloyloxy)ethyl]phenyl]-2H-benzotriazole as the monomer represented by the general formula (1), 35 parts of isostearyl acrylate as the monomer represented by the general formula (2), 35 parts of dicyclopentanyl methacrylate, and 1 part of 2-ethylhexyl 3-mercaptopropionate as the thiol-based chain transfer agent were put into a four-necked separable flask equipped with a thermometer, a stirrer, a dropping funnel, and a condenser, and stirred for 30 minutes under a stream of nitrogen. Then, 1.0 part of 2,2'-azobis(methyl isobutyrate) was put in, and the temperature was raised to reflux to initiate the polymerization reaction. After 2 hours from raising the temperature, 0.1 part of 2.2'-azobis(methyl isobutyrate) was added every hour and reacted for a total of 8 hours. Then, sampling was performed to confirm that the conversion rate was 98% or more, and after cooling, the mixture was diluted with methyl ethyl ketone to produce the resin solution b-1 having a non-volatile content of 30%.

Next, 300 parts of methanol was put into a 1 L beaker and stirred at 1,000 rpm using a dispenser, and 100 parts of the resin solution b-1 was added dropwise over 1 hour. Then, vacuum suction was performed using qualitative filter paper (manufactured by ADVANTEC, product name No. 2) with a Buchner funnel having a diameter of 150 mm, and the produced white precipitate was filtered. The time required to remove 200 g of the filtrate was less than 1 minute, and there was no problem with the filterability. Further, vacuum suction was continued for 30 minutes to confirm that no more filtrate came out. Subsequently, the obtained white precipitate was dried in a vacuum dryer at 50° C. for 12 hours to produce the polymer (B-1). The non-volatile content of the obtained polymer (B-1) was 99% or more.

As shown in Table 1 below, the ultraviolet absorbing polymers (B-2) to (B-10) were obtained in the same manner as the ultraviolet absorbing polymer (B-1), except that the monomers and chain transfer agent used were changed.
(Ultraviolet Absorbing Polymer (B-11))

250 parts of methyl ethyl ketone, 30 parts of 2-[2-hydroxy-5-[2-(methacryloyloxy)ethyl]phenyl]-2H-benzotriazole as the monomer unit represented by the general formula (1), 70 parts of dicyclopentanyl methacrylate as the monomer unit represented by the general formula (2), and 1 part of 1-dodecanethiol as the thiol-based chain transfer agent were put into a four-necked separable flask equipped with a thermometer, a stirrer, a dropping funnel, and a condenser, and stirred for 30 minutes under a stream of nitrogen. Then, 1.0 part of 2'-azobis(methyl isobutyrate) was put in, and the temperature was raised to reflux to initiate the polymerization reaction. After 2 hours from raising the temperature, 0.1 part of 2.2'-azobis(methyl isobutyrate) was added every hour and reacted for a total of 8 hours. Then, sampling was performed to confirm that the polymerization yield was 98% or more, and after cooling, the mixture was diluted with methyl ethyl ketone to produce the resin solution b-11 having a non-volatile content of 30%.

Next, 300 parts of hexane was put into a IL beaker and stirred at 1,000 rpm using a dispenser, and 100 parts of the resin solution b-11 was added dropwise over 1 hour. The polymer (B-11) had a gum-like precipitate, and a small amount of resin adhered to the dispenser and container.

Then, vacuum suction was performed using qualitative filter paper (manufactured by ADVANTEC, product name No. 2) with a Buchner funnel having a diameter of 150 mm, and the produced white precipitate was filtered. It took more than 1 minute to remove 200 g of the filtrate, indicating poor filterability. Further, vacuum suction was continued for 30 minutes to confirm that no more filtrate came out, and the obtained white precipitate was dried in a vacuum dryer at 50° C. for 12 hours. Since the non-volatile content did not reach 99% or more, the polymer was further dried in the vacuum dryer at 50° C. for 12 hours. After confirming that the non-volatile content reached 99%, the polymer (B-11) was obtained.
<Filterability>

400 g of the slurry solution of the ultraviolet absorbing polymer was vacuum sucked using qualitative filter paper (manufactured by ADVANTEC, product name No. 2) with a Buchner funnel having a diameter of 150 mm. At this time, the time required to remove 200 g of the filtrate was measured.

Good: time required is less than 1 minute
Bad: time required is 1 minute or more <Drying Property>

The white precipitate of the ultraviolet absorbing polymer was heated at 50° C. and dried in a vacuum dryer under a reduced pressure of 15 kPa(A), and the time required for the non-volatile content to reach 99% or more was measured.

Good: time required is less than 12 hours
Bad: time required is 12 hours or more <Measurement of the Concentration of Sulfur Atoms Derived from the Thiol-Based Chain Transfer Agent Residue>

0.1 g of the obtained ultraviolet absorbing polymer was placed on a sample boat for combustion device and heated at 100° C. for 5 minutes using a combustion device (automatic sample combustion device manufactured by Dia Instruments, model "AQF-100"). At this time, the gas generated from the ultraviolet absorbing polymer was passed through 10 mL of a hydrogen peroxide solution (absorption liquid) having a concentration of 30 ppm, and the sulfur-containing gas ($H_2S$, $SO_2$, etc.) contained in the generated gas was converted to $SO_4^{2-}$ and collected. Pure water was added to the absorption liquid after passing the generated gas to adjust the volume to 20 mL, and $SO_4^{2-}$ was quantitatively analyzed using an ion chromatograph (manufactured by Dionex, product name "DX-320") to determine the concentration of sulfur atoms contained in the ultraviolet absorbing polymer. The sulfur atom concentrations obtained in these measurements originate from the thiol-based chain transfer agent residue incorporated in the ultraviolet absorbing polymer or from the thiol-based chain transfer agent that could not be removed by purification.

TABLE 1

| | | Ultraviolet absorbing polymer (B) | Production example B-1 | Production example B-2 | Production example B-3 | Production example B-4 | Production example B-5 | Production example B-6 |
|---|---|---|---|---|---|---|---|---|
| Monomer mixture amount (weight ratio) | General formula (1) Monomer unit | Benzotriazole skeleton | 30 | 30 | 30 | 30 | 30 | 30 |
| | | Triazine skeleton | | | | | | |
| | | Benzophenone skeleton | | | | | | |
| | General formula (2) Monomer unit | Isostearyl acrylate | 35 | | | | | 35 |
| | | Dicyclopentanyl methacrylate | 35 | 70 | 70 | 70 | 70 | |
| | | 1-adamantyl methacrylate | | | | | | 35 |
| | Chain transfer agent | 3-mercaptopropionic acid | | 0.5 | | | | |
| | | α-thioglycerol | | | 0.5 | | | |
| | | 2-ethylhexyl 3-mercaptopropionate | 1 | | | 1 | | 0.5 |
| | | 3-methoxybutyl 3-mercaptopropionate | | | | | 1 | |
| | | 1-dodecanethiol | | | | | | |
| | Concentration of S element derived from thiol-based chain transfer agent | S element concentration wt % (theoretical value) | 0.145 | 0.150 | 0.147 | 0.145 | 0.165 | 0.073 |
| | | S element concentration wt % (measured value) | 0.110 | 0.110 | 0.100 | 0.090 | 0.100 | 0.040 |
| | | S element concentration wt % (amount removed by purification) | 0.04 | 0.04 | 0.05 | 0.06 | 0.07 | 0.03 |
| Weight average molecular weight | | | 21.000 | 18,000 | 19,000 | 20,000 | 19,000 | 35,000 |
| Number average molecular weight | | | 9,200 | 8,600 | 9,000 | 9,800 | 9,200 | 15,000 |
| Mw/Mn | | | 2.28 | 2.09 | 2.11 | 2.04 | 2.07 | 2.33 |
| Reprecipitation | | Purified solvent | Methanol | Methanol | Methanol | Methanol | Methanol | Methanol |
| | | Filterability | Good | Good | Good | Good | Good | Good |
| | | Drying property | Good | Good | Good | Good | Good | Good |
| | | Yield | 94% | 92% | 93% | 94% | 93% | 95% |

| | | | Production example B-7 | Production example B-8 | Production example B-9 | Production example B-10 | Production example B-11 |
|---|---|---|---|---|---|---|---|
| Monomer mixture amount (weight ratio) | General formula (1) Monomer unit | Benzotriazole skeleton | 30 | 30 | | | 30 |
| | | Triazine skeleton | | | 30 | | |
| | | Benzophenone skeleton | | | | 30 | |
| | General formula (2) Monomer unit | Isostearyl acrylate | 35 | 35 | | | |
| | | Dicyclopentanyl methacrylate | | | 70 | 70 | 70 |
| | | 1-adamantyl methacrylate | 35 | 35 | | | |

TABLE 1-continued

| | | | | | | |
|---|---|---|---|---|---|---|
| Chain transfer agent | 3-mercaptopropionic acid | | | | | |
| | α-thioglycerol | | | | | |
| | 2-ethylhexyl 3-mercaptopropionate | 1 | 1.5 | 1 | 1 | |
| | 3-methoxybutyl 3-mercaptopropionate | | | | | |
| | 1-dodecanethiol | | | | | 1 |
| Concentration of S element derived from thiol-based chain transfer agent | S element concentration wt % (theoretical value) | 0.145 | 0.217 | 0.145 | 0.145 | 0.157 |
| | S element concentration wt % (measured value) | 0.100 | 0.180 | 0.110 | 0.110 | 0.09 |
| | S element concentration wt % (amount removed by purification) | 0.05 | 0.04 | 0.04 | 0.04 | 0.067 |
| Weight average molecular weight | | 20,000 | 15,000 | 20,000 | 20,000 | 19,000 |
| Number average molecular weight | | 10,000 | 7,500 | 10,000 | 10,000 | 7,800 |
| Mw/Mn | | 2.00 | 2.00 | 2.00 | 2.00 | 2.44 |
| Reprecipitation | Purified solvent | Methanol | Methanol | Methanol | Methanol | Hexane |
| | | Good | Good | Good | Good | Bad |
| | | Good | Good | Good | Good | Bad |
| | | 94% | 91% | 92% | 92% | 70% |

The terms used in Table 1 are as follows.
Monomer unit represented by the general formula (1)
Benzotriazole skeleton: 2-[2-hydroxy-5-[2-(methacryloyloxy)ethyl]phenyl]-2H-benzotriazole
Triazine skeleton: compound (a1-4-1)
Benzophenone skeleton: 4-acryloyloxybenzophenone Example 1

[Production of the Resin Composition for Molding (Masterbatch)]

100 parts of polyethylene (Suntec LD M2270, MFR=7 g/10 min, manufactured by Asahi Kasei Chemicals) as the thermoplastic resin, and 20 parts of the ultraviolet absorbing polymer (B-1) were supplied from separate supply ports and melt-kneaded at 180° C. using a twin-screw extruder (manufactured by Japan Steel Works), cooled, and cut into pellets using a pelletizer to produce a masterbatch.

[Film Molding]

10 parts of the produced masterbatch was mixed with 100 parts of the polyethylene (Suntec LD M2270, MFR=7 g/10 min, manufactured by Asahi Kasei Chemicals) as the diluent resin. Then, it was melt-mixed at a temperature of 180° C. using a T-die molding machine (manufactured by Toyo Seiki Co., Ltd.) to mold a film having a thickness of 250 μm.

Examples 2 to 22, 27, 28, Comparative Example 1

The masterbatch and the film were produced in the same manner as in Example 1, except that the materials used in Example 1 were changed to the materials and blending amounts shown in Table 2.

Examples 23 to 26

The masterbatch and the film were produced in the same manner as in Example 1, except that the materials used in Example 1 were changed to the materials and blending amounts shown in Table 2, and the molding temperature was also changed to 270° C.

The thermoplastic resins and plasticizers used in this example are shown below.
(A-1): polyethylene (Suntec LD M2270, MFR=7 g/10 min, manufactured by Asahi Kasei Chemicals)
(A-2): polyethylene (Novatec UJ790, MFR=50 g/10 min, manufactured by Japan Polyethylene Corporation)
(A-3): polypropylene (Novatec PP FA3EB, MFR=10.5 g/10 min, manufactured by Japan Polypropylene Corporation)
(A-4): polypropylene (Prime Polypro J226T, MFR=20 g/10 min, manufactured by Prime Polymer Co., Ltd.)
(A-5): polycarbonate (Iupilon S3000, MFR=15 g/10 min, manufactured by Mitsubishi Engineering-Plastics)
(A-6): polymethacrylic resin (Acrypet MF, MFR=14 g/10 min, manufactured by Mitsubishi Rayon Co., Ltd.)
(A-7): polyester (Mitsui PETSA135, manufactured by Mitsui Chemicals)
(A-8): cycloolefin resin (TOPAS5013L-10, manufactured by Mitsui Chemicals)
(A-9): polyvinyl chloride (SCB200JA, manufactured by Sun Arrow Kasei Co., Ltd.)
(A-10): polyvinylidene chloride (Saran Latex L574A, manufactured by Asahi Kasei Chemicals)
Plasticizer: epoxidized soybean oil (Adekasizer O-130P, manufactured by ADEKA)

The following items were evaluated with respect to the films obtained in the above Examples and Comparative Examples.

[Purification Process Workability]

Productivity was evaluated with respect to the filterability and drying property in the purification process of the ultraviolet absorbing polymer.
Good: no particular problem in the filtration process and the drying process
Bad: decrease in workability is observed in either the filtration process or the drying process

[Ultraviolet Absorbency]

The transmittance of the molded film was measured using an ultraviolet-visible near infrared spectrophotometer (manufactured by Shimadzu Corporation). The transmittance was measured as a spectral transmittance with respect to a white standard plate. It was evaluated whether or not the following conditions were satisfied. The evaluation criteria are as follows.

⊚: the light transmittance of the wavelength 290 to 360 nm is less than 2% over the entire region. Good.
◯: there is a partial region where the light transmittance is 2% or more in the wavelength range of 290 to 360 nm. Practical range.
x: the light transmittance of the wavelength 290 to 360 nm is 2% or more over the entire region. Not practical.

[Light Resistance Test]

The molded film was exposed to light with a wavelength of 300 to 400 nm at an illuminance of 60 W/m² for 1500 hours using a xenon weather meter. The evaluation criteria are as follows.

⊚: no yellowing is observed. Good.
◯: slight yellowing is observed. Practical range.
x: yellowing is clearly observed. Not practical.

[Transparency]

The transparency of the molded film was visually evaluated. The evaluation criteria are as follows.

⊚: no turbidity is observed. Excellent.
◯: almost no turbidity is observed. Good.
Δ: slight turbidity is observed. Practical range.
x: turbidity is clearly observed. Not practical.

[Odor Evaluation]

The molded film was cut into 10 cm squares, placed and sealed in an aluminum vapor deposition bag, and left still at 40° C. for 24 hours. Then, the odor was confirmed by five monitors.

⊚: almost no odor is observed. (None of the monitors perceives any odor). Good.
◯: slight odor is observed. (One to three monitors perceive the odor). Practical range.
x: odor is clearly observed. (Four or more monitors perceive the odor). Not practical.

TABLE 2

| | Masterbatch | | | | | | T-die film Masterbatch |
|---|---|---|---|---|---|---|---|
| | Thermoplastic resin | | Ultraviolet absorbing polymer | | Plasticizer | | |
| Example | Type | Part | Type | Part | Type | Part | Part |
| Example 1 | A-1 | 100 | B-1 | 20 | | | 10 |
| Example 2 | A-1 | 100 | B-2 | 20 | | | 10 |
| Example 3 | A-1 | 100 | B-3 | 20 | | | 10 |
| Example 4 | A-1 | 100 | B-4 | 20 | | | 10 |
| Example 5 | A-1 | 100 | B-5 | 20 | | | 10 |
| Example 6 | A-1 | 100 | B-6 | 20 | | | 10 |
| Example 7 | A-1 | 100 | B-7 | 20 | | | 10 |
| Example 8 | A-1 | 100 | B-8 | 20 | | | 10 |
| Example 9 | A-1 | 100 | B-9 | 20 | | | 10 |
| Example 10 | A-1 | 100 | B-10 | 20 | | | 10 |
| Example 11 | A-3 | 100 | B-1 | 20 | | | 10 |
| Example 12 | A-3 | 100 | B-2 | 20 | | | 10 |
| Example 13 | A-3 | 100 | B-3 | 20 | | | 10 |
| Example 14 | A-3 | 100 | B-4 | 20 | | | 10 |
| Example 15 | A-3 | 100 | B-5 | 20 | | | 10 |
| Example 16 | A-3 | 100 | B-6 | 20 | | | 10 |
| Example 17 | A-3 | 100 | B-7 | 20 | | | 10 |
| Example 18 | A-3 | 100 | B-8 | 20 | | | 10 |
| Example 19 | A-3 | 100 | B-9 | 20 | | | 10 |
| Example 20 | A-3 | 100 | B-10 | 20 | | | 10 |
| Example 21 | A-2 | 100 | B-4 | 20 | | | 10 |
| Example 22 | A-4 | 100 | B-4 | 20 | | | 10 |
| Example 23 | A-5 | 100 | B-4 | 20 | | | 10 |
| Example 24 | A-6 | 100 | B-4 | 20 | | | 10 |
| Example 25 | A-7 | 100 | B-4 | 20 | | | 10 |
| Example 26 | A-8 | 100 | B-4 | 20 | | | 10 |
| Example 27 | A-9 | 100 | B-4 | 20 | O-130P | 4 | 10 |
| Example 28 | A-10 | 100 | B-4 | 20 | | | 10 |
| Comparative Example 1 | A-1 | 100 | B-11 | 20 | | | 10 |

| | T-die film Diluent resin | | Evaluation | | | | |
|---|---|---|---|---|---|---|---|
| | | | Purification process | Ultraviolet | Light | | |
| Example | Type | Part | workability | absorbency | resistance | Transparency | Odor |
| Example 1 | A-1 | 100 | Good | ⊚ | ⊚ | ◯ | ⊚ |
| Example 2 | A-1 | 100 | Good | ⊚ | ⊚ | ⊚ | ◯ |
| Example 3 | A-1 | 100 | Good | ⊚ | ⊚ | ⊚ | ◯ |
| Example 4 | A-1 | 100 | Good | ⊚ | ⊚ | ⊚ | ⊚ |
| Example 5 | A-1 | 100 | Good | ⊚ | ⊚ | ⊚ | ⊚ |
| Example 6 | A-1 | 100 | Good | ⊚ | ⊚ | ◯ | ⊚ |
| Example 7 | A-1 | 100 | Good | ⊚ | ⊚ | ⊚ | ⊚ |
| Example 8 | A-1 | 100 | Good | ⊚ | ⊚ | ⊚ | ⊚ |
| Example 9 | A-1 | 100 | Good | ⊚ | ⊚ | ⊚ | ⊚ |
| Example 10 | A-1 | 100 | Good | ◯ | ◯ | ⊚ | ⊚ |
| Example 11 | A-3 | 100 | Good | ⊚ | ⊚ | ◯ | ⊚ |
| Example 12 | A-3 | 100 | Good | ⊚ | ⊚ | ⊚ | ◯ |

TABLE 2-continued

| | | | | | | | | |
|---|---|---|---|---|---|---|---|---|
| Example 13 | A-3 | 100 | Good | ◎ | ◎ | ◎ | ○ | |
| Example 14 | A-3 | 100 | Good | ◎ | ◎ | ◎ | ◎ | |
| Example 15 | A-3 | 100 | Good | ◎ | ◎ | ◎ | ◎ | |
| Example 16 | A-3 | 100 | Good | ◎ | ◎ | ○ | ◎ | |
| Example 17 | A-3 | 100 | Good | ◎ | ◎ | ◎ | ◎ | |
| Example 18 | A-3 | 100 | Good | ◎ | ◎ | ◎ | ◎ | |
| Example 19 | A-3 | 100 | Good | ◎ | ◎ | ◎ | ◎ | |
| Example 20 | A-3 | 100 | Good | ○ | ○ | ◎ | ◎ | |
| Example 21 | A-2 | 100 | Good | ◎ | ◎ | ◎ | ◎ | |
| Example 22 | A-4 | 100 | Good | ◎ | ◎ | ◎ | ◎ | |
| Example 23 | A-5 | 100 | Good | ◎ | ◎ | ◎ | ◎ | |
| Example 24 | A-6 | 100 | Good | ◎ | ◎ | ◎ | ◎ | |
| Example 25 | A-7 | 100 | Good | ◎ | ◎ | ◎ | ◎ | |
| Example 26 | A-8 | 100 | Good | ◎ | ◎ | ◎ | ◎ | |
| Example 27 | A-9 | 100 | Good | ◎ | ◎ | ◎ | ◎ | |
| Example 28 | A-10 | 100 | Good | ◎ | ◎ | ◎ | ◎ | |
| Comparative Example 1 | A-1 | 100 | Bad | ◎ | ◎ | ○ | ○ | |

As shown in Table 2, the resin composition for molding containing the ultraviolet absorbing polymer that uses the thiol-based chain transfer agent having one or more moieties selected from a carboxyl group, a hydroxyl group, and an ester bond can be efficiently purified at low cost and can form a molded body that has good transparency and little odor and has good compatibility with a thermoplastic resin, especially polyolefin.

What is claimed is:

1. A resin composition for molding, comprising a thermoplastic resin and an ultraviolet absorbing polymer, wherein
   the ultraviolet absorbing polymer is a polymer having a monomer unit represented by the following general formula (1), a monomer unit represented by the following general formula (2), and a thiol-based chain transfer agent residue, and
   a thiol-based chain transfer agent forming the thiol-based chain transfer agent residue has a thiol group and one or more moieties selected from a group consisting of a carboxyl group, a hydroxyl group, and an ester bond;

[Chemical formula 1]

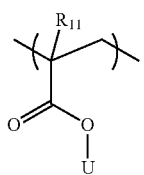

General formula (1)

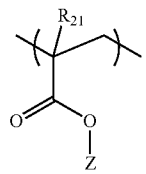

General formula (2)

wherein
in general formula (1), $R_{11}$ represents any one selected from a group consisting of a hydrogen atom and a methyl group, and U is a hydrocarbon group having a skeleton that absorbs ultraviolet rays and may contain a heteroatom, wherein the skeleton is selected from the group consisting of a benzotriazole skeleton, a triazine skeleton, and a benzophenone, and
in general formula (2), $R_{21}$ represents any one selected from a group consisting of a hydrogen atom and a methyl group, and Z represents any one selected from a group consisting of a chain hydrocarbon group having 10 or more carbon atoms and a cyclic hydrocarbon group.

2. The resin composition for molding according to claim 1, comprising 0.001 to 0.3 parts by mass of sulfur atoms derived from the thiol-based chain transfer agent with respect to 100 parts by mass of total monomer units of the ultraviolet absorbing polymer.

3. The resin composition for molding according to claim 1, comprising 30 to 85% by mass of the monomer unit represented by general formula (2) in 100% by mass of total monomer units of the ultraviolet absorbing polymer.

4. The resin composition for molding according to claim 1, wherein a weight average molecular weight of the ultraviolet absorbing polymer is 3,000 to 150,000.

5. A molded body obtained by molding the resin composition for molding according to claim 1.

* * * * *